(12) United States Patent
Love et al.

(10) Patent No.: US 7,495,632 B2
(45) Date of Patent: *Feb. 24, 2009

(54) DISPLAY SOURCE DIVIDER

(75) Inventors: Michael G. Love, San Francisco, CA (US); John Allen Tardif, San Jose, CA (US); Louis F. Coffin, III, Mountain View, CA (US); Jack A. Scheuer, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 561 days.

This patent is subject to a terminal disclaimer.

(21) Appl. No.: 11/244,271

(22) Filed: Oct. 5, 2005

(65) Prior Publication Data

US 2006/0028394 A1    Feb. 9, 2006

Related U.S. Application Data

(63) Continuation of application No. 10/409,496, filed on Apr. 8, 2003, now Pat. No. 7,098,868.

(51) Int. Cl.
*G09G 5/00* (2006.01)

(52) U.S. Cl. ........................ 345/1.1; 382/286

(58) Field of Classification Search ........... 345/1.1, 345/1.2, 1.3, 2.1, 2.2, 4–6; 382/286, 294
See application file for complete search history.

(56) References Cited

U.S. PATENT DOCUMENTS

| | | |
|---|---|---|
| 4,190,856 A | 2/1980 | Ricks |
| 4,734,779 A | 3/1988 | Levis et al. |
| 4,792,720 A | 12/1988 | Takenaka et al. |
| 4,922,349 A | 5/1990 | Abe et al. |
| 5,105,183 A | 4/1992 | Beckman |
| 5,281,957 A | 1/1994 | Schoolman |
| 5,675,828 A | 10/1997 | Stoel et al. |
| 5,801,785 A | 9/1998 | Crump et al. |
| 5,860,086 A | 1/1999 | Crump et al. |
| 5,875,463 A | 2/1999 | Crump et al. |
| 6,008,820 A | 12/1999 | Chavin et al. |

(Continued)

FOREIGN PATENT DOCUMENTS

JP    2000352962    12/2000

(Continued)

OTHER PUBLICATIONS

Office Action from the Patent Office of the State Intellectual Property office of the People's Republic of China, Application No. 200410034205.8, mailed on Jan. 26, 2007, 16 Pages.

*Primary Examiner*—Richard Hjerpe
*Assistant Examiner*—Tom V Sheng
(74) *Attorney, Agent, or Firm*—Lee & Hayes, PLLC

(57) ABSTRACT

In an implementation of a display source divider, a video generation system generates a video display source that includes display data for multiple display regions on a display device. For example, a gaming system generates a video display source that includes display data for a partitioned display, where each region of the partitioned display corresponds to a different player of the gaming system. A display source divider receives the video display source and generates multiple video streams each corresponding to a different display region of the partitioned display.

12 Claims, 10 Drawing Sheets

U.S. PATENT DOCUMENTS

| | | | |
|---|---|---|---|
| 6,104,414 A * | 8/2000 | Odryna et al. | 345/536 |
| 6,148,118 A | 11/2000 | Murakami et al. | |
| 6,151,621 A | 11/2000 | Coyler et al. | |
| 6,262,694 B1 | 7/2001 | Ishimoto et al. | |
| 6,501,441 B1 | 12/2002 | Ludtke et al. | |
| 6,579,184 B1 | 6/2003 | Tanskanen | |
| 6,628,243 B1 | 9/2003 | Lyons et al. | |
| 6,674,481 B1 | 1/2004 | Umemura et al. | |
| 6,680,714 B2 | 1/2004 | Wilmore | |
| 6,915,347 B2 | 7/2005 | Hanko et al. | |
| 7,091,929 B2 | 8/2006 | Bronson | |
| 2001/0040532 A1 | 11/2001 | Yasuda | |
| 2002/0046300 A1 | 4/2002 | Hanko et al. | |
| 2002/0101992 A1 | 8/2002 | Laaksonen | |
| 2003/0202581 A1 | 10/2003 | Kodama | |
| 2003/0227423 A1 | 12/2003 | Arai et al. | |
| 2004/0047518 A1 | 3/2004 | Tiana | |
| 2004/0075621 A1 | 4/2004 | Shiuan et al. | |
| 2004/0222941 A1 | 11/2004 | Wong et al. | |

FOREIGN PATENT DOCUMENTS

| | | |
|---|---|---|
| JP | 20002219270 | 8/2002 |

\* cited by examiner

DISPLAY SOURCE DIVIDER

RELATED APPLICATIONS

This application is a continuation of and claims priority to U.S. patent application Ser. No. 10/409,496 entitled "Display Source Divider" filed Apr. 8, 2003 to Love et al., the disclosure of which is incorporated by reference herein.

BACKGROUND

Some video systems, such as multi-player gaming systems, generate video that is divided into different display regions of a partitioned display screen. For example, a display screen can be partitioned into two display regions for two players of a race car driving game. An upper display region shows an image of the first player's race car, a section of the race course, and surrounding terrain as the first player interacts with the gaming system to navigate the race course. Similarly, a lower display region shows an image of the second player's race car, a section of the race course, and surrounding terrain as the second player interacts with the gaming system to navigate the race course. The upper display region provides the visual feedback for the first player to interact, via a game controller, with the gaming system and the lower display region provides the visual feedback for the second player to interact, via a second game controller, with the gaming system. A display screen may also be partitioned into thirds or quadrants where each of the display regions has a different image that corresponds to one of the players of a gaming system. Each display region of a partitioned display screen can contain an image that is different from, or similar to, images contained in the other display regions.

Typically, these video generation systems, such as multi-player gaming systems, are designed to generate a single stream of video data that includes all of the display data for each of the different display regions which are configured for simultaneous display on a single partitioned display screen. In most instances, a multi-player gaming system is connected to only one display device, such as a television. Thus, this one television has to provide the visual feedback for multiple players of the gaming system. One problem associated with partitioning a display device for multi-player interactive feedback is that the display regions are smaller than if displayed full-screen. More display regions results in smaller viewing areas for each player of a multi-player gaming system which may be inadequate to provide a desirable interactive visual feedback to the players.

A further problem associated with partitioned displays is that each player of a multi-player gaming system can see the visual feedback for all of the other players as well. This type of multi-player feedback may enhance the interaction for both players of the race car driving game, but is not desirable for such competitive activities as football games where a first player independently selects an offensive play while the second player independently selects a defensive play hoping to counteract the selected offensive play. In this example, the first player has a great interest in keeping the selected offensive play from being known by the second player. However, with a partitioned display, the second player can easily observe the first player's selection and vice-versa.

Accordingly, for video systems that generate a single stream of video data that includes display data for different display regions of a single partitioned display screen, it is desirable that each display region can be isolated and independently rendered on a separate display device.

SUMMARY

This summary is provided to introduce simplified concepts of display source divider which is further described below in the Detailed Description. This summary is not intended to identify essential features of the claimed subject matter, nor is it intended for use in determining the scope of the claimed subject matter.

In an embodiment, a display source divider receives display data for multiple display regions of a partitioned display and replicates the display data to generate multiple video streams each corresponding to a different one of the display regions. The display source divider includes multiple display region processors that each obscure the pixel data of all but a designated one of the display regions and shifts the timing synchronization for the designated display region such that each display region is re-positioned for display on a respective display device.

In another embodiment, a display source divider receives display data for multiple display regions of a partitioned display and horizontally resamples the display data to generate display region data that corresponds to one or more of the display regions being re-sized horizontally. The display source divider vertically resamples the display region data such that the one or more display regions are re-sized vertically. The display source divider includes multiple display region timing generators, each of which generates timing synchronization data for a different one of the display regions such that a display region is positioned for full-screen display on a respective display device.

BRIEF DESCRIPTION OF THE DRAWINGS

The same numbers are used throughout the drawings to reference like features and components.

DETAILED DESCRIPTION

A display source divider is described that receives display data for multiple display regions of a partitioned display and generates multiple video streams each corresponding to a different one of the display regions. Video systems, such as multi-player gaming systems, generate a single stream of video data that includes display data for different display regions of a single partitioned display screen. The display source divider isolates and processes each display region to be independently rendered on a separate display device. As described herein, the timing synchronization data for a particular display region can be shifted, the pixel data corresponding to the display region can be resampled, and/or the display region can be re-sized for display on a respective display device.

Figure 1:
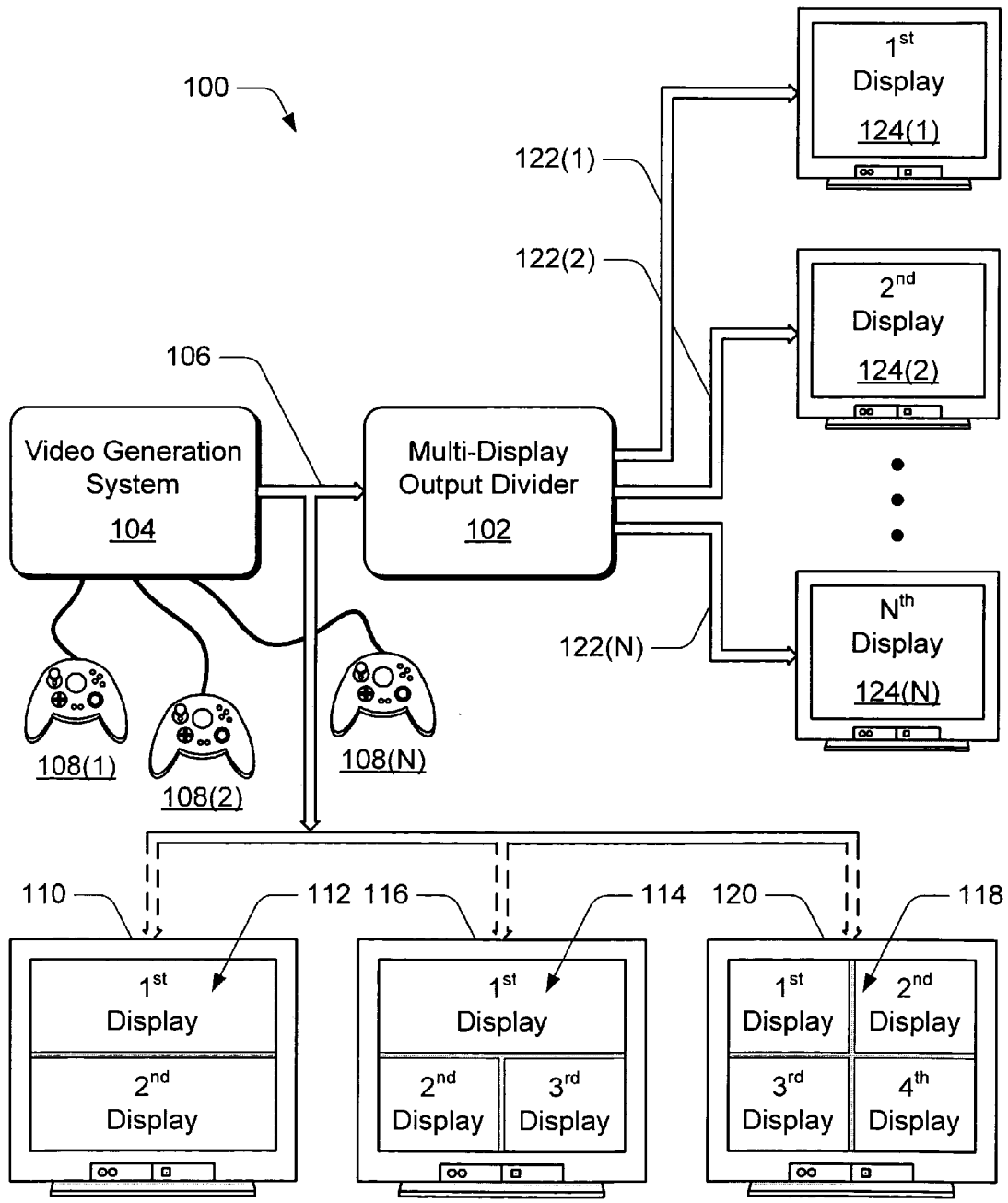
FIG. 1 illustrates various components of an exemplary multi-display system.

FIG. 1 illustrates an exemplary multi-display system 100 in which a multi-display output divider 102 can be implemented. The multi-display system 100 includes a video generation system 104 that generates a video display source 106 which is encoded to include display data for multiple display regions of a partitioned display. For example, the video generation system 104 may be a multi-player gaming system that includes game controllers 108 which are provided for player interaction with the gaming system. The gaming system 104 (i.e., video generation system) generates the video display source 106 that includes the display data for multiple players of the gaming system. Although not shown in this example, the video generation system 104 may be implemented with any number and combination of differing components as further described below with reference to the exemplary computing device shown in FIG. 10.

The video display source 106 can be generated to include display data for any number of display regions of a partitioned display. For example, a display device 110 can be connected to the video generation system 104 to receive the video display source 106 which can include display data for a partitioned display 112 that is rendered on display device 110. In this display mode, the partitioned display 112 includes two display regions, the first being rendered as an upper display region and the second being rendered as a lower display region. The display regions of a partitioned display can be separated by what appears as a black bar or line between the display regions to identify the visually distinct regions. Alternatively, the display regions can be positioned, or otherwise rendered, adjacent each other on a display in an edge-to-edge fashion. In such a case, the visual distinctiveness of the individual display regions is apparent by the difference in appearance between the display regions, such as motion and/or color variation differences.

In this example of partitioned display 112, the first display region can show an image of a first player's race car and a section of a race course for a race car driving game as a first player interacts with the gaming system 104 via controller 108(1) to navigate the race course. Similarly, the second display region can show an image of a second player's race car and a section of the race course as the second player interacts with the gaming system 104 via controller 108(2) to navigate the race course. The first display region provides the visual feedback for the first player to interact with the gaming system 104 and the second display region provides the visual feedback for the second player to interact with the gaming system 104. Although the partitioned display 112 is shown to have a first, upper display region and a second, lower display region, the two display regions may be generated as right and left display regions of the partitioned display 112.

The video display source 106 may also be generated to include display data for other display modes, such as partitioned display 114 rendered on display device 116 and partitioned display 118 rendered on display device 120. Although shown together in FIG. 1, each of these display modes are alternate configurations that are typically generated by a video generation system depending on, for example, how many players are engaged to interact with the multi-player gaming system at any one time. If only two players are participating in the race car driving game, the application program for the driving game can generate the video display source 106 to include only display data for the two players and be configured for partitioned display 112 on display device 110. If, however, a third player joins to participate in the race car driving game, the application program can then generate the video display source 106 to include display data for the three players and be configured for partitioned display 114 on display device 116.

Different video generation systems can generate any number of different display modes having different display region configurations to be rendered on a partitioned display device. Further, each display region of a partitioned display can contain an image that is different from, or similar to images contained in other regions of the partitioned display. For example, each of the four display regions in partitioned display 118 on display device 120 may have a different image, one for each of four different players of the gaming system 104 (i.e., the video generation system).

The multi-display output divider 102 is implemented in the multi-display system 100 to receive the video display source 106 and generate multiple video streams 122 each corresponding to a different display region of what would be a partitioned display. For example, if video display source 106 is generated to include display data for the three display regions of partitioned display 114, the multi-display output divider 102 generates a first video stream 122(1) corresponding to the first display region for display on a first display device 124(1), a second video stream 122(2) corresponding to the second display region for display on a second display device 124(2), and a third video stream 122(N) corresponding to the third display region for display on a third display device 124(N).

Each of the multiple display devices 124 receive a different one of the video streams 122 and render a display of a different one of the display regions. The display devices are coupled to the multi-display output divider 102 via an RF (radio frequency) link, S-video link, composite video link, component video link, or other similar communication link. Additionally, the display devices 124 need not be located within visual proximity of each other. For example, the display devices 124 can each be located in a different room of a house where each player of a multi-player gaming system cannot see the other players, or the other players' visual feedback displays.

The multi-display output divider 102 can be implemented as an independent appliance device that is coupled to the video generation system 104 via video and/or audio cable connections. Alternatively, the multi-display output divider 102 can be implemented as an integral or attachable audio-visual component of a video generation system to isolate and generate display data for individual display regions such that each display region can be independently rendered on a separate display device. Although not shown in this example, the multi-display output divider 102 may be implemented with any number and combination of differing components as further described below with reference to the exemplary computing device shown in FIG. 10.

The multi-display output divider 102 can also be implemented to receive configuration information associated with a video display source 106 that includes any number of display regions of a partitioned display. The configuration information about the number and display mode of the display regions can be utilized by the multi-display output divider 102 to generate a corresponding number of video streams 122 and to format the display data for each individual display region. The configuration information can be encoded within the video display source 106, such as information generated by an application program of the video generation system to identify the display mode layout of the display regions. In this case, a game developer encodes the game application to partition the single video display source 106 into non-overlapping regions.

The configuration information can also be received as a user-configurable selection control, or can be determined with an auto-detection system incorporated as a component system of the multi-display output divider 102. One example of a display region auto-detection system is described in a concurrently-filed U.S. patent application Ser. No. 10/409,507 filed Apr. 8, 2003, entitled "Video Division Detection Methods and Systems", to Mike Love, the disclosure of which is incorporated by reference herein.

Figure 2:
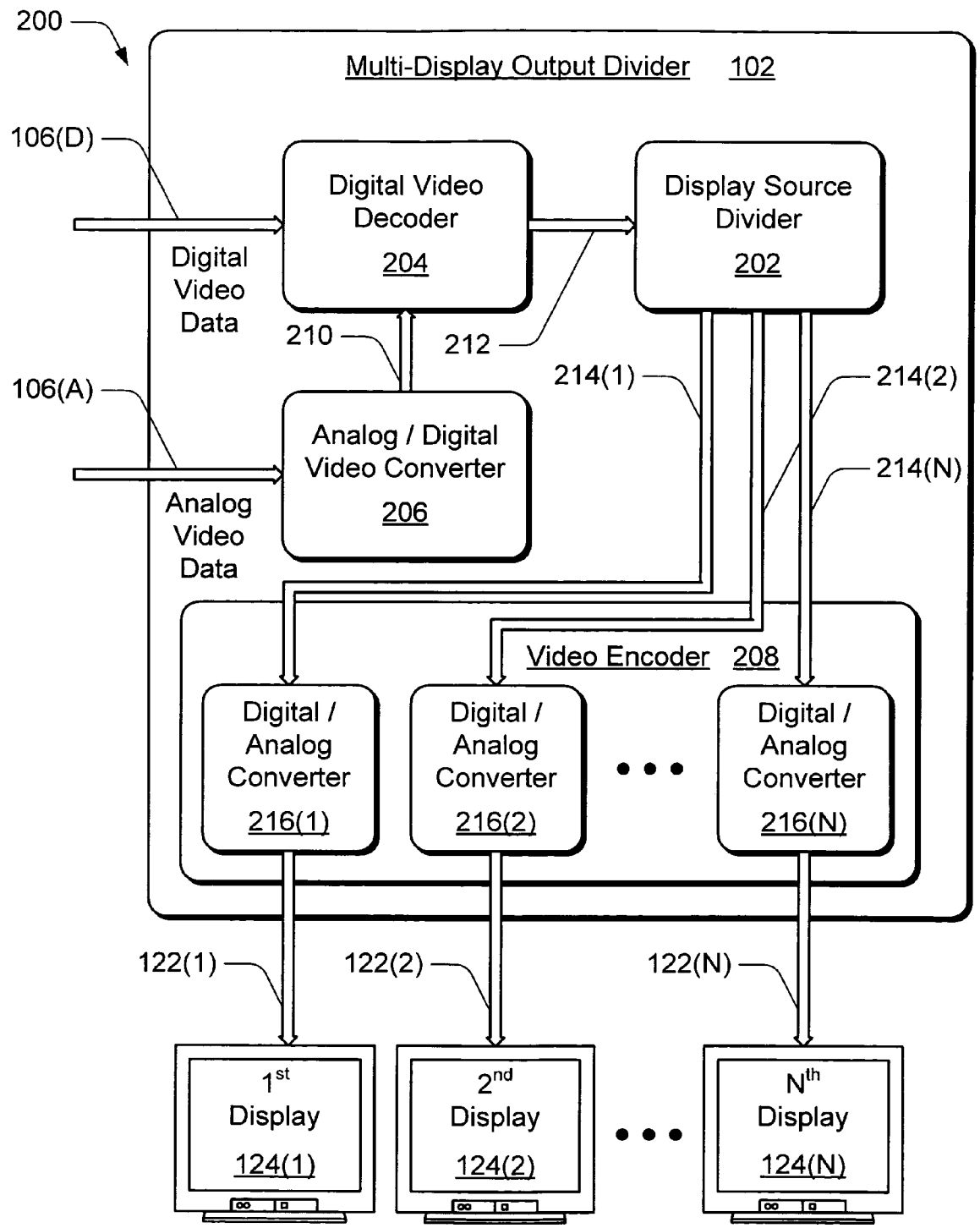
FIG. 2 illustrates an exemplary implementation of a multi-display output divider.

FIG. 2 illustrates an exemplary implementation 200 of the multi-display output divider 102 (FIG. 1) which includes a display source divider 202, a digital video decoder 204, an analog-to-digital video converter 206, and a video encoder 208. The digital video decoder 204 receives the video display source 106 as digital video data 106(D), or the analog-to-digital video converter 206 receives the video display source 106 as analog video data 106(A). In an event that the video display source 106 is received as analog video data 106(A), the analog-to-digital video converter 206 digitizes the analog video data 106(A) to generate digital video data 210 for input to the digital video decoder 204.

The digital video decoder 204 converts the digital video data input 106(A), or 210, into uncompressed digital pixel data in an event that the video inputs are not already. The digital video decoder 204 outputs a digital video display source 212 that is input to the display source divider 202. The digital video display source 212 includes the display data (now uncompressed digital display data) for the multiple display regions of a partitioned display. The display source divider 202 generates multiple video streams 214 that each correspond to a different one of the display regions.

The multiple video streams 214 are input to the video encoder 208 which includes multiple digital-to-analog converters 216 that each convert a different one of the multiple video streams 214 to analog video data such that each display region is configured for display on a separate display device 124. For example, if video display source 106 is generated to include display data for the three display regions of partitioned display 114 (FIG. 1), the display source divider 202 generates a first video stream 214(1) corresponding to the first display region, a second video stream 214(2) corresponding to the second display region, and a third video stream 214(N) corresponding to the third display region.

A first digital-to-analog converter 216(1) of the video encoder 208 converts the first video stream 214(1) to analog video data stream 122(1) for display on the first display device 124(1). A second digital-to-analog converter 216(2) converts the second video stream 214(2) to analog video data stream 122(2) for display on the second display device 124(2), and a third digital-to-analog converter 216(N) converts the third video stream 214(N) to analog video data stream 122(N) for display on the third display device 124(N).

Figure 3:
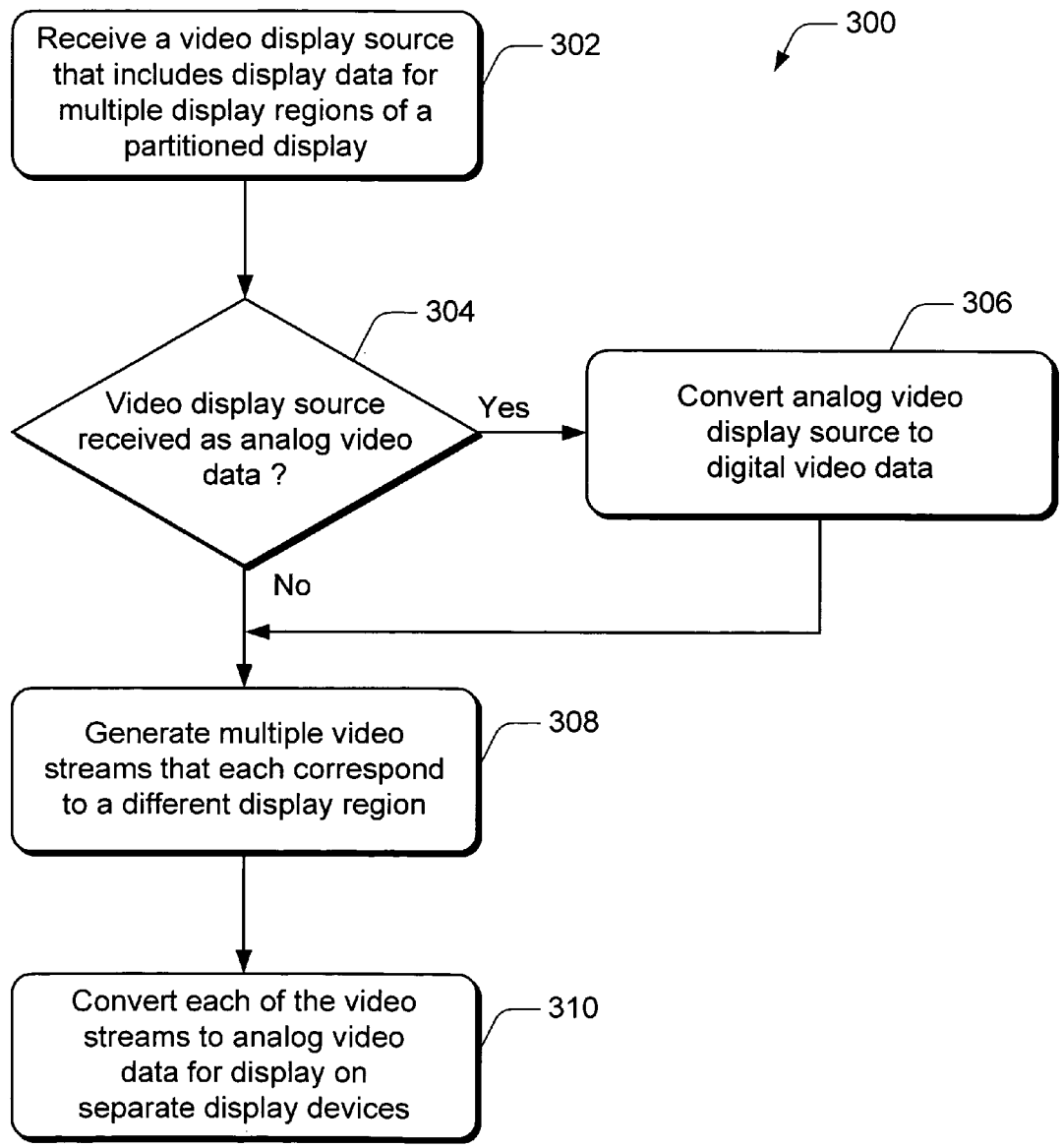
FIG. 3 illustrates an exemplary method for a multi-display output divider.

FIG. 3 illustrates a method 300 for a multi-display output divider. The order in which the method is described is not intended to be construed as a limitation, and any number of the described method blocks can be combined in any order to implement the method. Furthermore, the method can be implemented in any suitable hardware, software, firmware, or combination thereof.

At block 302, a video display source is received that includes display data for multiple display regions of a partitioned display. For example, multi-display output divider 102 receives video display source 106 that includes display data for multiple display regions (e.g., any of the $1^{st}$, $2^{nd}$, $3^{rd}$, and $4^{th}$ display regions) of a partitioned display (e.g., any of partitioned displays 112, 114, and 118). The video display source can be received from a gaming system that generates the display data for multiple players of the gaming system.

At block 304, a determination is made as to whether the video display source is received as analog video data. If the video display source is received as analog video data (i.e., "yes" from block 304), the analog video display source is converted to digital video data at block 306. For example, the analog-to-digital video converter 206 receives analog video data 106(A) and converts the analog video data 106(A) to digital video data 210.

If the video display source is received as digital video data (i.e., "no" from block 304), or after the analog video display source has been converted to digital video data at block 306, multiple video streams are generated that each correspond to a different display region such that each display region is configured for display on a separate display device, at block 308. For example, display source divider 202 generates multiple video streams 214. Each video stream 214 corresponds to a different display region of a partitioned display (e.g., any of partitioned displays 112, 114, and 118) such that each display region (e.g., any of the $1^{st}$, $2^{nd}$, $3^{rd}$, and $4^{th}$ display regions) can be independently displayed on a separate display device 124.

At block 310, each of the multiple video streams is converted to analog video data for display on separate display devices. For example, the digital-to-analog converters 216 of the video encoder 208 each convert one of the video streams 214 to analog video data 122 for display on a respective display device 124.

Figure 4:
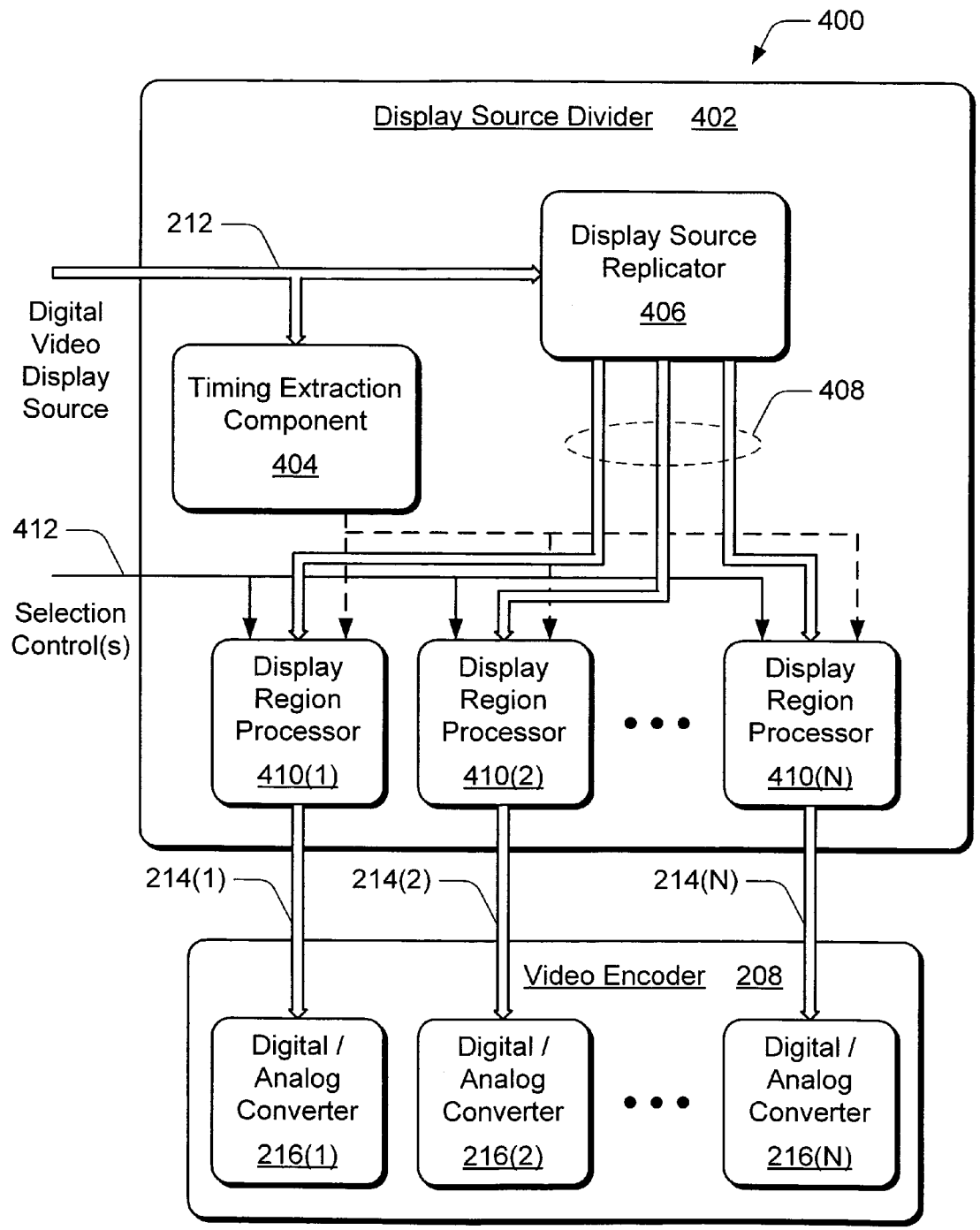
FIG. 4 illustrates an exemplary implementation of a display source divider.

FIG. 4 illustrates an exemplary implementation 400 of a display source divider 402 (this is an example implementation of the display source divider 202 shown in FIG. 2). The display source divider 402 includes a timing extraction component 404 and a display source replicator 406. The timing extraction component 404 processes the digital video display source 212 to determine such information as the video format and the timing synchronization data for the multiple display regions. The format of the digital video display source 212 can be any number of different standard definition television formats such as NTSC, PAL, SECAM, and the like.

The display source replicator 406 receives the digital video display source 212 and replicates the video display source to generate multiple video streams 408. As described above, the digital video display source 212 includes the display data for the multiple display regions of a partitioned display device. The display source replicator 406 generates as many video streams 408 as there are display regions encoded in the video display source 212.

The display source divider 402 also includes multiple display region processors 410 that each receive one of the replicated video streams 408. A display region processor 410 receives a video stream 408, as well as information from the timing extraction component 404, and processes the digital video stream 408 to configure a designated one of the display regions for display on a respective display device. For example, display region processor 410(1) receives a video stream 408 and processes the video stream to generate video stream 214(1) which corresponds to one of the display regions being configured for display on a separate display device. The video stream 214(1) is input to the digital-to-analog converter 216(1) in video encoder 208 to convert the digital video stream 214(1) to the analog video data stream 122(1) for display on the first display device 124(1) (FIG. 2).

A display region processor 410 configures a designated one of the display regions for display by obscuring, or otherwise blacking-out, the pixel data of all but the designated display region such that only the designated display region has a discernable image when rendered on a display device. Additionally, the display region processor 410 shifts the horizontal and vertical timing synchronization for the designated display region such that the designated display region is re-positioned horizontally and/or vertically for display on the display device. In this example, each of the video streams 408 includes the pixel data for all of the display regions. However, all but the designated display region are obscured so that only the designated display region will be viewable as an image when rendered on a display device.

Each of the display region processors 410 can receive a selection control input 412 that designates which of the display regions is to be associated with a particular display region processor. The display region processors 410 can be automatically associated with a particular display region (i.e., video stream 408). For example, display region processor 410(1) can be associated with a first display region, display region processor 410(2) can be associated with a second display region, and so on. Alternatively, a control input 412 can be optionally user-selectable such that players of a multi-player gaming system can designate which display regions are processed for display on which display devices.

Figure 5:
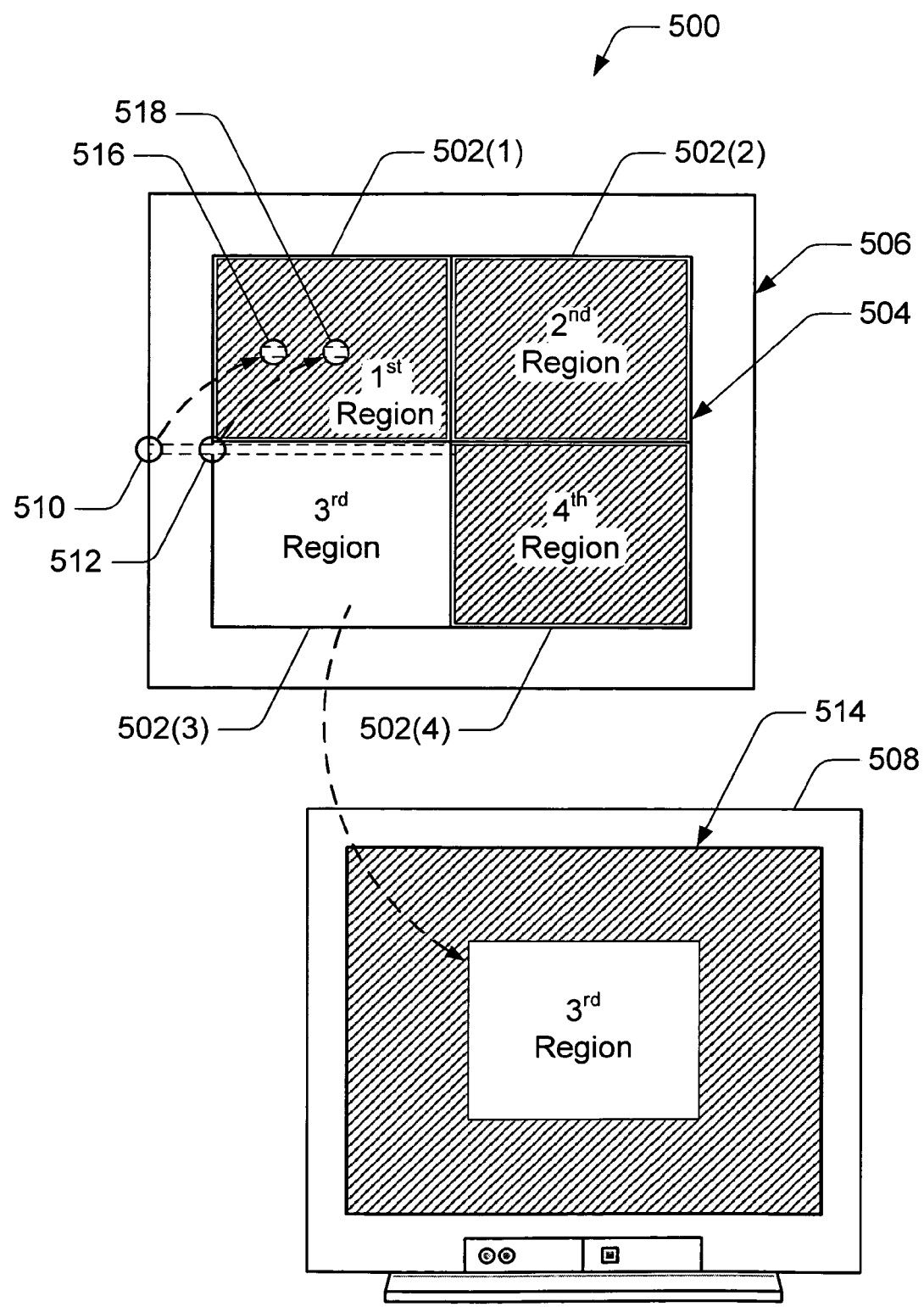
FIG. 5 illustrates an example of display region processing.

FIG. 5 illustrates an example 500 of a display region timing shift. Four display regions 502(1-4) are arranged in a quadrant display mode in an active region 504 and are shown as they would be rendered for display on a display device. A blanking region 506 is shown around the active region 504. A horizontal blanking region is utilized by a television to trigger a horizontal retrace of the electron beam that is used to render the image on the television screen. When a horizontal retrace is triggered, the electron beam, which has progressed from the left of the screen to the right of the screen, returns to the next lower line at the left side of the screen to begin another horizontal tracing pass. A vertical blanking region is utilized by the television to trigger a vertical retrace of the electron beam that is used to render the image on the television screen. When a vertical retrace is triggered, the electron beam returns from the bottommost right side of the screen to the topmost left side of the screen to begin rendering a horizontal line at the top of the screen.

In this example, a display region processor 410 (FIG. 4) obscures, or otherwise blacks-out, the pixel data of the first, second, and fourth display regions such that only the third display region 502(3) has a discernable image when rendered on a display device 508. Additionally, the display region processor 410 shifts the horizontal and vertical timing synchronization codes for display positions 510 and 512 which are associated with the third display region 502(3) such that the third display region is re-positioned for display 514 on the display device 508. A display region can be re-centered horizontally and/or vertically when being re-positioned for display, or the display region can be re-positioned anywhere on the display. In this example, the third display region 502(3) is re-centered for display on the display device 508.

The display region processor 410 shifts the blanking region timing synchronization codes for display position 510 and the active region timing synchronization codes for display position 512 to display positions 516 and 518, respectively, which re-centers the display region 502(3) horizontally and vertically. The pixel data codes for the display region 502(3) are relative to the start and stop timing synchronization codes at display positions 510 and 512. When the display region 502(3) is re-positioned for display in this example, the pixel data for the display region is not changed, nor is the display region re-sized to a full-screen display.

For an active region having 480 vertical lines and 640 horizontal lines, each display region 502 is two-hundred and forty (240) vertical lines by three-hundred and twenty (320) horizontal lines. To re-center the third display region 502(3), the display region is shifted up one-hundred and twenty (120) vertical lines which, in practice, shifts the timing synchronization codes sixty (60) vertical lines because they are interlaced. The display region is also shifted one-hundred and sixty (160) horizontal lines to the right which requires shifting the timing synchronization codes to the left.

Although this example 500 illustrates an active region 504 having four display regions 502(1-4) of equal size and arranged in a two-by-two arrangement, any number of display region configurations, sizes, and offsets, to include overlapping display regions, can be processed by a display region processor 410 such that each of the display regions is individually re-positioned on a display device for viewing.

Figure 6:
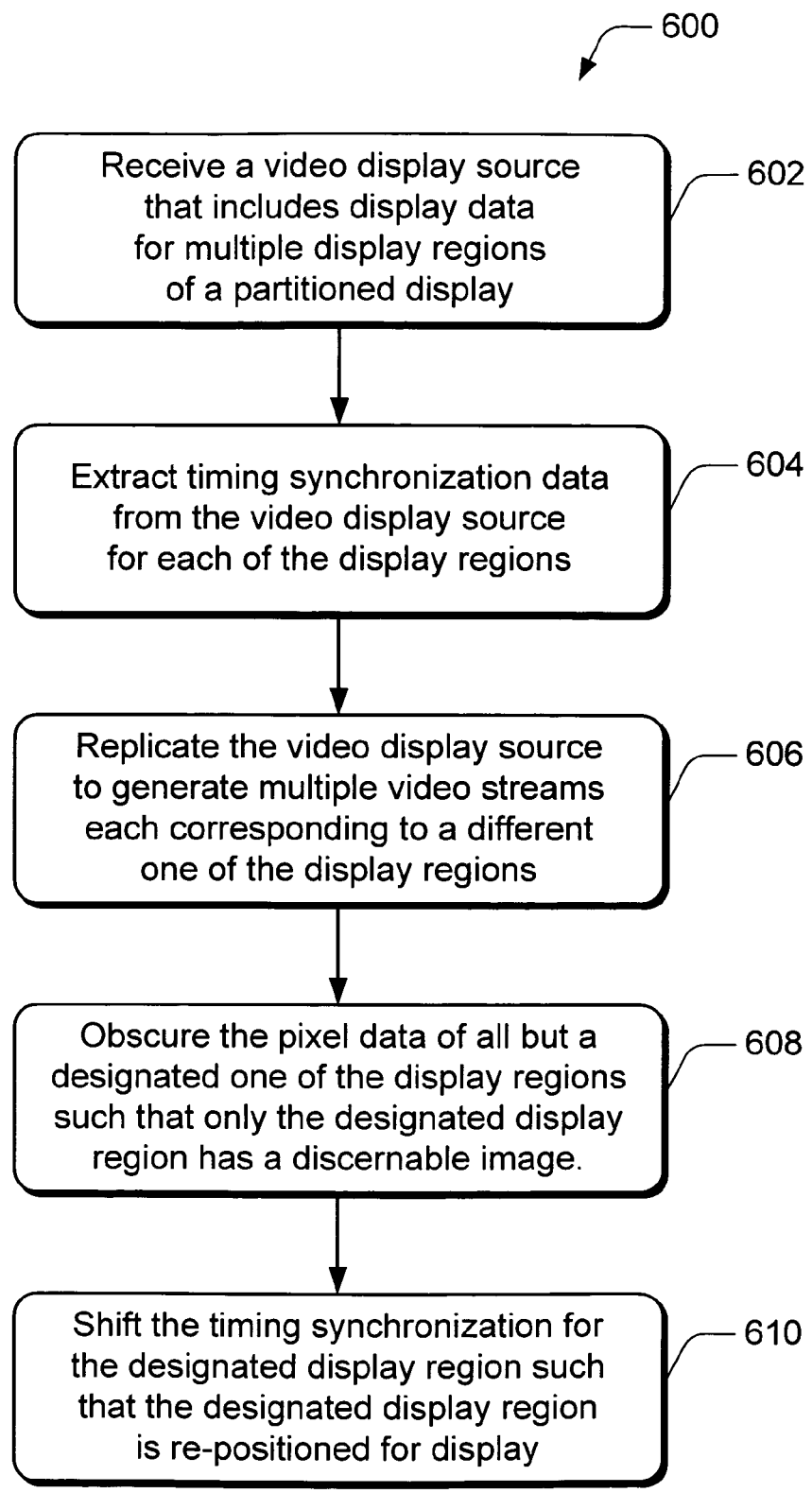
FIG. 6 illustrates an exemplary method for a display source divider.

FIG. 6 illustrates a method 600 for a display source divider. The order in which the method is described is not intended to be construed as a limitation, and any number of the described method blocks can be combined in any order to implement the method. Furthermore, the method can be implemented in any suitable hardware, software, firmware, or combination thereof.

At block 602, a video display source is received that includes display data for multiple display regions of a partitioned display. At block 604, timing synchronization data is extracted from the video display source for each of the display regions. For example, timing extraction component 404 extracts the horizontal and vertical timing synchronization data from the digital video display source 212 for each of the display regions 502 in the active region 504.

At block 606, the video display source is replicated to generate multiple video streams each corresponding to a different one of the display regions. For example, display source replicator 406 replicates the digital video display source 212 to generate the multiple video streams 408 where each video stream corresponds to a different display region 502.

At block 608, pixel data of all but a designated one of the display regions is obscured such that only the designated display region has a discernable image. For example, a display region processor 410 corresponding to a particular video stream 408 obscures, or otherwise blacks-out the pixel data of the display regions 502(1), 502(2), and 502(4) such that only the third display region 502(3) has a discernable image.

At block 610, the timing synchronization for the designated display region is shifted such that the designated display region is re-positioned for display. For example, the display region processor 410 corresponding to the third display region 502(3) shifts the horizontal and vertical timing synchronization data (active region timing synchronization codes for display position 512 and blanking region timing synchronization codes for display position 510) such that the third display region 502(3) is re-positioned horizontally and/or vertically for display 514 on display device 508.

Figure 7:
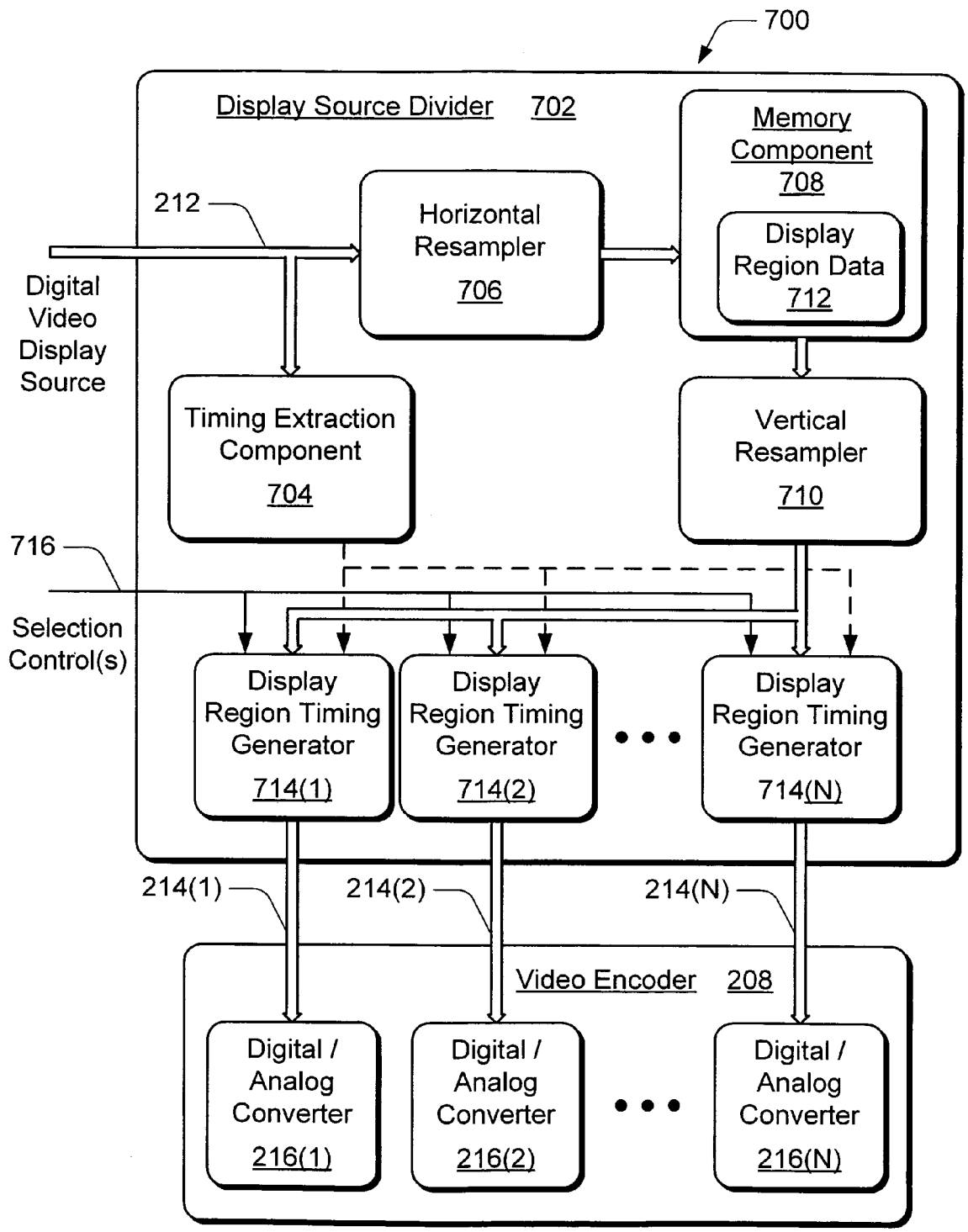
FIG. 7 illustrates an exemplary implementation of a display source divider.

FIG. 7 illustrates an exemplary implementation 700 of a display source divider 702 (this is another example implementation of the display source divider 202 shown in FIG. 2). The display source divider 702 includes a timing extraction component 704, a horizontal resampler 706, a memory component 708, and a vertical sampler 710. The timing extraction component 704 processes the digital video display source 212 to determine such information as the video format and the timing synchronization data for the multiple display regions. The format of the digital video display source 212 can be any number of different standard definition television formats such as NTSC, PAL, SECAM, and the like.

The horizontal resampler 706 receives the digital video display source 212 and horizontally resamples the video display source to generate display region data 712 that corresponds to one or more of the display regions being re-sized horizontally. As described above, the digital video display source 212 includes the display data for the multiple display regions of a partitioned display device. The memory component 708 is implemented as a buffer to maintain the horizontally resampled display region data 712.

The vertical resampler 710 resamples the display region data 712 such that the one or more display regions are also re-sized vertically. The horizontal resampler 706 and the vertical resampler 710 can be implemented to horizontally and vertically resample the digital video display source to maintain a preset aspect ratio of any one of the display regions. In this example, the digital video display source 212 can be received in a high definition format from which any number of the display regions can be horizontally and vertically resampled for standard definition format display. Additionally, any number of the display regions can be maintained for high definition format display.

The display source divider 702 also includes multiple display region timing generators 714 each of which receives the horizontal and vertical resampled digital video display source. Each of the display region timing generators 714 receives the resampled video display source, as well as information from the timing extraction component 704, and generates timing synchronization data for a different one of the display regions such that a respective display region is configured for full-screen display on a respective display device. For example, display region timing generator 714(1) receives the resampled video display source and processes the video stream to generate video stream 214(1) which corresponds to one of the display regions being re-sized and configured for display on a separate display device. The video stream 214(1) is input to the digital-to-analog converter 216(1) in video encoder 208 to convert the digital video stream 214(1) to the analog video data stream 122(1) for display on the first display device 124(1) (FIG. 2).

A display region timing generator 714 can also receive the resampled video display source, as well as the information from the timing extraction component 704, and generate the timing synchronization data for a different one of the display regions such that a respective display region can be displayed at any resolution (e.g., not just a full-screen display). For example, a display region having a four-by-three (4×3) aspect ratio source can be re-sized to display with a sixteen-by-nine (16×9) aspect ratio and have black bars shown on the sides of the viewable image. Similarly, a quadrant display region having a sixteen-by-nine (16×9) aspect ratio source can be re-sized to display with a four-by-three (4×3) aspect ratio and have black bars shown on the top and bottom of the display.

Each of the display region timing generators 714 can receive a selection control input 716 that designates which of the display regions is to be associated with a particular display region timing generator. The display region timing generators can be automatically associated with a particular display region of the resampled digital video display source. For example, display region timing generator 714(1) can be associated with a first display region, display region timing generator 714(2) can be associated with a second display region, and so on. Alternatively, a control input 716 can be optionally user-selectable such that players of a multi-player gaming system can designate which display regions are processed for display on which display devices.

Figure 8:
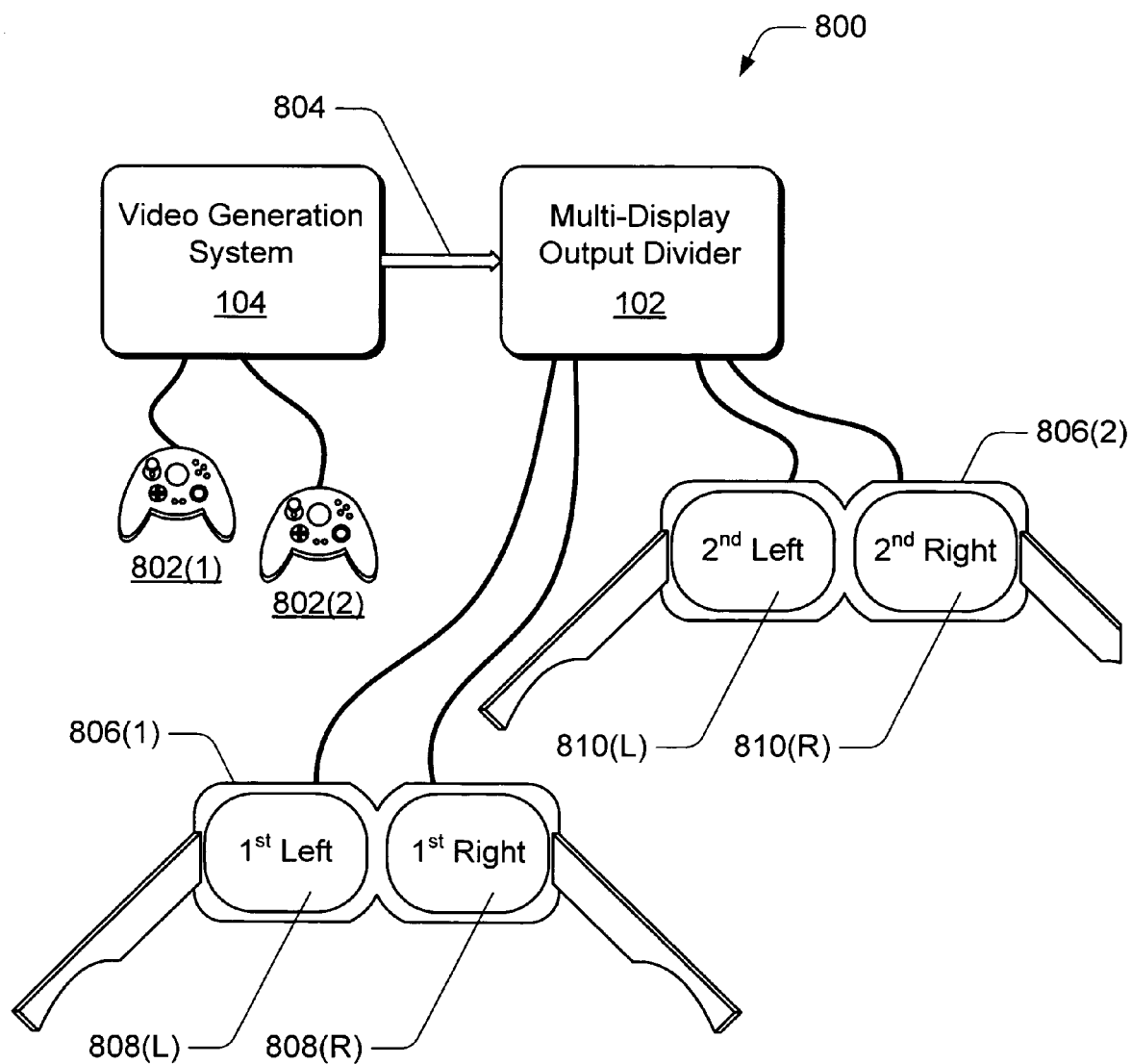
FIG. 8 illustrates an exemplary multi-display output divider implemented as a component of a gaming system.

FIG. 8 illustrates another exemplary multi-display system 800 in which the multi-display output divider 102 can be implemented. The multi-display system 800 also includes the video generation system 104 which may be implemented as a multi-player gaming system that includes game controllers 802 which are provided for player interaction with the gaming system. The gaming system 104 (i.e., video generation system) generates a video display source 804 which is encoded to include left and right display data for head-mounted display devices 806.

Each player of the gaming system 104 can receive interactive visual feedback from independent left and right images displayed on a left and a right display panel within a head-mounted display device 806. For example, a first player can interact with the gaming system 104 via game controller 802(1) and receive an interactive visual feedback from a left display image 808(L) and a right display image 808(R) displayed within the head display device 806(1). Similarly, a second player can interact with the gaming system 104 via game controller 802(2) and receive an interactive visual feedback from a left display image 810(L) and a right display image 810(R) displayed within the head display device 806(2).

The multi-display output divider 102 generates a left eye display video stream and an associated right eye display video stream for each of the head display devices 806. The multi-display output divider 102 can be implemented to generate the video streams as described above with reference to the exemplary implementation 200 (FIG. 2) of the multi-display output divider, the exemplary implementation 400 (FIG. 4) of display source divider 402, and/or the exemplary implementation 700 of display source divider 702.

Figure 9:
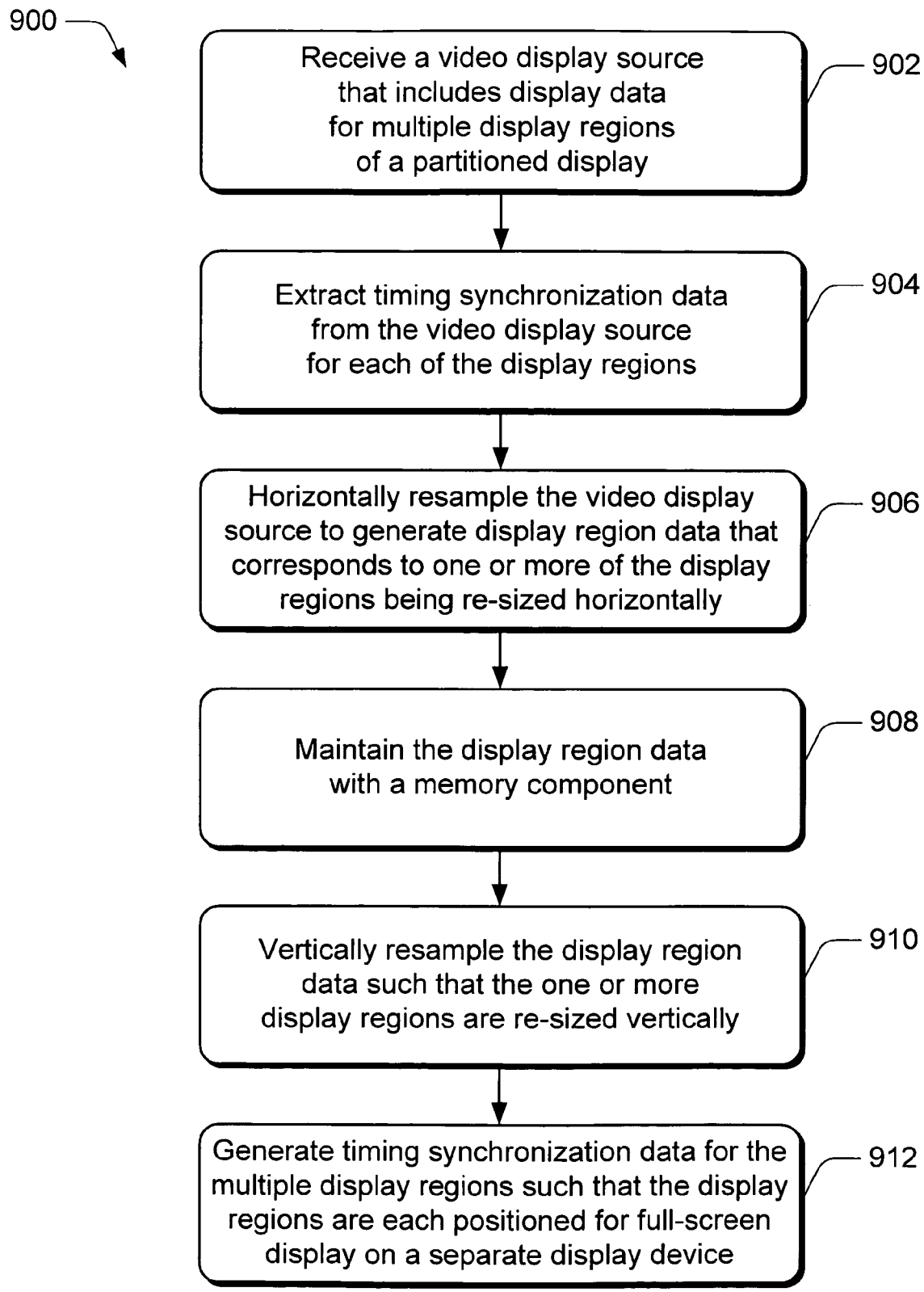
FIG. 9 illustrates an exemplary method for a display source divider.

FIG. 9 illustrates a method 900 for a display source divider. The order in which the method is described is not intended to be construed as a limitation, and any number of the described method blocks can be combined in any order to implement the method. Furthermore, the method can be implemented in any suitable hardware, software, firmware, or combination thereof.

At block 902, a video display source is received that includes display data for multiple display regions of a partitioned display. The video display source can be received from a gaming system (e.g., video generation system 104 shown in FIG. 8) that generates the display data for multiple players of the gaming system, where the multiple display regions are for left eye display regions 808(L) and 810(L) and corresponding right eye display regions 808(R) and 810(R), respectively, for head display devices 806.

At block 904, timing synchronization data is extracted from the video display source for each of the multiple display regions. For example, timing extraction component 704 extracts the horizontal and vertical timing synchronization data from the digital video display source 212 for each of the display regions of a partitioned display, or head display devices 806.

At block 906, the video display source is horizontally resampled to generate display region data that corresponds to one or more of the display regions being re-sized horizontally. For example, horizontal resampler 706 resamples the display data of video display source 212 to generate display region data 712. At block 908, the display region data is maintained with a memory component. For example, the horizontally resampled display region data 712 is maintained, or otherwise buffered, with memory component 708.

At block 910, the display region data is vertically resampled such that the one or more display regions are re-sized vertically. For example, vertical resampler 710 resamples the display region data 712 (which has been horizontally resampled) such that the display regions of the partitioned display are re-sized vertically as well as horizontally.

At block 912, timing synchronization data for the multiple display regions is generated such that the display regions are each positioned for full-screen display on a separate display device. For example, a particular display region timing generator 714 receives input from the timing extraction component 704 and generates the timing synchronization for a corresponding display region that has been re-sized (e.g., horizontally and/or vertically resampled) such that the display region is positioned for a full-screen display.

The methods 300 (FIG. 3), 600 (FIG. 6), and 900 (FIG. 9) for a display source divider may be described in the general context of computer executable instructions. Generally, computer executable instructions include routines, programs, objects, components, data structures, procedures, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer readable media, including memory storage devices.

Figure 10:
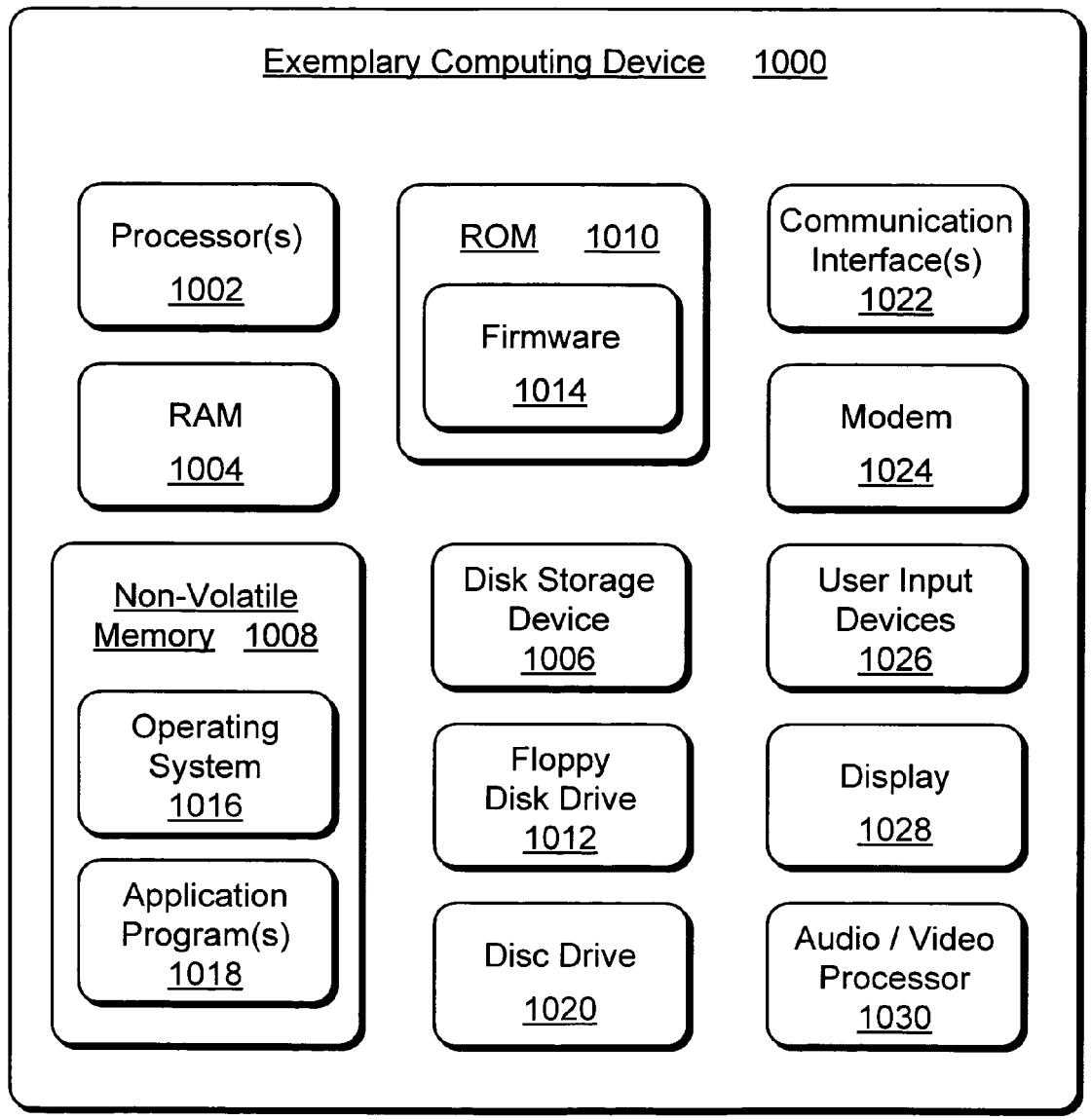
FIG. 10 illustrates an exemplary computing device that can be implemented as a component of a display source divider system.

FIG. 10 illustrates an exemplary computing device 1000 that includes one or more processors 1002 (e.g., any of microprocessors, controllers, and the like) which process various instructions to control the operation of computing device 1000 and to communicate with other electronic and computing devices. Computing device 1000 can be implemented with one or more memory components, examples of which include a random access memory (RAM) 1004, a disk storage device 1006, non-volatile memory 1008 (e.g., any one or more of a read-only memory (ROM) 1010, flash memory, EPROM, EEPROM, etc.), and a floppy disk drive 1012.

Disk storage device 1006 can include any type of magnetic or optical storage device, such as a hard disk drive, a magnetic tape, a recordable and/or rewriteable compact disc (CD), a DVD, DVD+RW, and the like. The one or more memory components provide data storage mechanisms to store various information and/or data such as configuration information for computing device 1000, graphical user interface information, and any other types of information and data related to operational aspects of computing device 1000. Alternative implementations of computing device 1000 can include a range of processing and memory capabilities, and may include any number of differing memory components than those illustrated in FIG. 10.

Exemplary computing device 1000 includes a firmware component 1014 that is implemented as a permanent memory module stored on ROM 1010, or with other components in computing device 1000, such as a component of a processor 1002. Firmware 1014 is programmed and distributed with computing device 1000 to coordinate operations of the hardware within computing device 1000 and contains programming constructs used to perform such operations.

An operating system 1016 and one or more application program(s) 1018 can be stored in non-volatile memory 1008 and executed on processor(s) 1002 to provide a runtime environment. A runtime environment facilitates extensibility of computing device 1000 by allowing various interfaces to be defined that, in turn, allow the application programs 1018 to interact with computing device 1000. The application programs 1018 can include a browser to browse the Web (e.g., "World Wide Web"), an email program to facilitate electronic mail, and any number of other application programs.

Exemplary computing device 1000 includes a disc drive 1020 that can be implemented to read any type of removable optical disc, such as a compact disc (CD), a DVD, and the like. Computing device 1000 further includes one or more communication interfaces 1022 and a modem 1024. The communication interfaces 1022 can be implemented as any one or more of a serial and/or parallel interface, as a wireless interface, any type of network interface, and as any other type of communication interface. A wireless interface enables computing device 1000 to receive control input commands and other information from an input device, such as from, a remote control device or from another infrared (IR), 802.11, Bluetooth, or similar RF input device.

A network interface provides a connection between computing device 1000 and a data communication network which allows other electronic and computing devices coupled to a common data communication network to communicate information to computing device 1000 via the network. Similarly, a serial and/or parallel interface provides a data communication path directly between computing device 1000 and another electronic or computing device. Modem 1024 facilitates computing device 1000 communication with other electronic and computing devices via a conventional telephone line, a DSL connection, cable, and/or other type of connection.

Computing device 1000 may include user input devices 1026 that can include a keyboard, mouse, pointing device, controller, and/or other mechanisms to interact with, and to input information to computing device 1000. Computing device 1000 also may include an integrated display device 1028, such as for a potable computing device and similar mobile computing devices.

Computing device 1000 also includes an audio/video processor 1030 that generates display content for display on the display device 1028, and/or for display on an external display device. The audio/video processor 1030 also generates audio content for presentation by a presentation device, such as one or more speakers (not shown). The audio/video processor 1030 can include a display controller that processes the display content to display corresponding images on the display device 1028, or on an external display device. A display controller can be implemented as a graphics processor, microcontroller, integrated circuit, and/or similar video processing component to process the images. Video signals and audio signals can be communicated from computing device 1000 to an external display device via an RF (radio frequency) link, S-video link, composite video link, component video link, or other similar communication link.

Although shown separately, some of the components of computing device 1000 may be implemented in an application specific integrated circuit (ASIC). Additionally, a system bus (not shown) typically connects the various components within computing device 1000. A system bus can be implemented as one or more of any of several types of bus structures, including a memory bus or memory controller, a peripheral bus, an accelerated graphics port, or a local bus using any of a variety of bus architectures.

Although embodiments of display source divider have been described in language specific to structural features and/or methods, it is to be understood that the subject of the appended claims is not necessarily limited to the specific features or methods described. Rather, the specific features and methods are disclosed as exemplary implementations of the methods and systems for display source divider.

The invention claimed is:

1. One or more computer-readable media comprising computer executable instructions that, when executed, direct a display source divider of a multi-display system to perform a method, the method comprising:
- receiving a video display source from a gaming system that generates display data for multiple players of the gaming system, the video display source including the display data for multiple display regions of a partitioned display;
- extracting timing synchronization data from the video display source for each of the multiple display regions;
- generating multiple video streams each corresponding to a different one of the multiple display regions; and
- shifting timing synchronization for each of the multiple display regions such that a display region is re-positioned for display.

2. One or more computer-readable media as recited in claim 1, wherein the method further comprises converting the video display source to digital video data in an event that the video display source is received as analog video data.

3. One or more computer-readable media as recited in claim 1, wherein the method further comprises converting each of the multiple video streams to analog video data such that each of the multiple display regions is configured for display on a separate display device.

4. One or more computer-readable media as recited in claim 1, wherein the method further comprises replicating the video display source to generate the multiple video streams.

5. One or more computer-readable media as recited in claim 1, wherein the method further comprises:
- obscuring pixel data of all but a designated one of the multiple display regions; and
- shifting timing synchronization for the designated display region such that the designated display region is re-positioned for display.

6. One or more computer-readable media as recited in claim 1, wherein the method further comprises:
- obscuring pixel data of all but a designated one of the multiple display regions; and
- shifting horizontal timing synchronization and vertical timing synchronization for the designated display region such that the designated display region is re-positioned horizontally and vertically for display.

7. One or more computer-readable media as recited in claim 1, wherein the method further comprises:
- resampling horizontally the video display source to generate display region data that corresponds to at least one of the multiple display regions being re-sized horizontally; and
- resampling vertically the display region data such that the at least one display region is re-sized vertically.

8. One or more computer-readable media comprising computer executable instructions that, when executed, direct a display source divider of a multi-display system to perform a method, the method comprising:
- receiving a video display source that includes display data for multiple display regions on a display device;
- extracting timing synchronization data from the video display source for each of the multiple display regions;
- replicating the video display source to generate multiple video streams each corresponding to a different one of the multiple display regions;
- obscuring pixel data of all but a designated one of the multiple display regions, and
- shifting time synchronization for the designated display region such that the designated display region is re-positioned for display.

9. One or more computer-readable media as recited in claim 8, wherein the method further comprises converting the video display source to digital video data in an event that the video display source is received as analog video data.

10. One or more computer-readable media as recited in claim 8, wherein the shifting comprises shifting horizontal timing synchronization and vertical timing synchronization for the designated display region such that the designated display region is re-positioned horizontally and vertically for display.

11. One or more computer-readable media comprising computer executable instructions that, when executed, direct a display source divider of a multi-display system to perform a method, the method comprising:
- receiving a video display source that includes display data for multiple display regions on a display device;
- extracting timing synchronization data from the video display source for each of the multiple display regions;
- resampling horizontally the video display source to generate display region data that corresponds to one or more of the multiple display regions being re-sized horizontally;
- resampling vertically the display region data such that the one or more multiple display regions are re-sized vertically; and
- generating timing synchronization data such that the multiple display regions are each positioned for full-screen display on a separate display device.

12. One or more computer-readable media as recited in claim 11, wherein the method further comprises converting the video display source to digital video data in an event that the video display source is received as analog video data.

* * * * *